(12) United States Patent
Tessier et al.

(10) Patent No.: US 10,173,348 B2
(45) Date of Patent: Jan. 8, 2019

(54) MODULAR MANDREL FOR MONOLITHIC COMPOSITE FUSELAGE

(71) Applicant: Bell Helicopter Textron Inc., Fort Worth, TX (US)

(72) Inventors: Sylvain Tessier, Fassett (CA); Richard Gingras, Montreal (CA); Jacques Dionne, Saint-André-d'Argenteuil (CA); Felix Bednar, Laval (CA)

(73) Assignee: Bell Helicopter Textron Inc., Fort Worth, TX (US)

(*) Notice: Subject to any disclaimer, the term of this patent is extended or adjusted under 35 U.S.C. 154(b) by 143 days.

(21) Appl. No.: 15/264,410

(22) Filed: Sep. 13, 2016

(65) Prior Publication Data
US 2017/0072598 A1    Mar. 16, 2017

Related U.S. Application Data

(60) Provisional application No. 62/218,278, filed on Sep. 14, 2015.

(51) Int. Cl.
*B29C 33/48* (2006.01)
*B29C 70/32* (2006.01)
(Continued)

(52) U.S. Cl.
CPC ........ *B29C 33/485* (2013.01); *B29C 33/3807* (2013.01); *B29C 70/32* (2013.01);
(Continued)

(58) Field of Classification Search
None
See application file for complete search history.

(56) References Cited

U.S. PATENT DOCUMENTS 3,988,103 A * 10/1976 Hoffnneister ......... B29C 33/485
                                                    425/403
6,823,578 B2    11/2004 Anderson et al.
(Continued)

FOREIGN PATENT DOCUMENTS

| CA | 2810728 A1 | 9/2013 |
| CA | 2810982 A1 | 9/2013 |

(Continued)

OTHER PUBLICATIONS

Office Action in related Canadian Patent Application No. 2,942,115, dated Nov. 9, 2017, 4 pages.

*Primary Examiner* — Barbara J Musser

(57) ABSTRACT

A method of manufacturing a self-supporting, monolithic fuselage body, including engaging peripheral mandrel sections around at least one central mandrel section, placing uncured composite material on the mold surface, curing the composite material on the mold surface, and sliding the central mandrel section(s) out of engagement with the peripheral mandrel sections and disengaging the peripheral mandrel sections from the cured composite material without collapsing the mandrel sections. The peripheral mandrel sections each include a shape-retaining core of a thermally insulating material and an outer layer on an outer surface of the shape-retaining core. The outer layer has a coefficient of thermal expansion within the range of variation of that of the coefficient of thermal expansion of the composite material. A mandrel for layup and cure of a predetermined composite material in the manufacture of a monolithic fuselage is also discussed.

9 Claims, 4 Drawing Sheets

(51) Int. Cl.
  *B29C 33/38* (2006.01)
  *B29K 105/08* (2006.01)
  *B29K 63/00* (2006.01)
  *B29K 307/04* (2006.01)
  *B29L 31/30* (2006.01)

(52) U.S. Cl.
  CPC .. *B29K 2063/00* (2013.01); *B29K 2105/0872* (2013.01); *B29K 2307/04* (2013.01); *B29K 2863/00* (2013.01); *B29K 2903/00* (2013.01); *B29K 2907/04* (2013.01); *B29K 2995/0013* (2013.01); *B29K 2995/0015* (2013.01); *B29L 2031/3082* (2013.01)

(56) References Cited

U.S. PATENT DOCUMENTS

| | | | |
|---|---|---|---|
| 7,059,034 | B2 | 6/2006 | Anderson et al. |
| 7,166,251 | B2 | 1/2007 | Blankinship |
| 7,431,239 | B2 | 10/2008 | Anderson et al. |
| 7,459,048 | B2 | 12/2008 | Pham et al. |
| 7,648,661 | B2 | 1/2010 | Hanson |
| 7,815,160 | B2 | 10/2010 | Stenard |
| 7,968,021 | B2 | 6/2011 | Cleary et al. |
| 8,091,603 | B2 | 1/2012 | Pham et al. |
| 8,245,750 | B2 | 8/2012 | Sommer et al. |
| 8,474,684 | B2 | 7/2013 | Sommer et al. |
| 8,524,025 | B2 | 9/2013 | Pram et al. |
| 8,691,037 | B2 | 4/2014 | Ingram et al. |
| 9,038,686 | B2 | 5/2015 | Sibona et al. |
| 9,120,246 | B2 | 9/2015 | Oldroyd et al. |
| 9,238,335 | B2 | 1/2016 | Robins et al. |
| 9,327,467 | B2 | 5/2016 | Robins et al. |
| 9,376,219 | B2 | 6/2016 | Sibona et al. |
| 2011/0017384 | A1 | 1/2011 | Oriet et al. |
| 2012/0103530 | A1 | 5/2012 | Pham et al. |
| 2012/0112377 | A1 | 5/2012 | Bennett |
| 2016/0243730 | A1 | 8/2016 | Robins et al. |

FOREIGN PATENT DOCUMENTS

| | | |
|---|---|---|
| CA | 2843930 A1 | 9/2014 |
| EP | 2087951 B1 | 8/2010 |
| EP | 2121288 B1 | 2/2012 |
| EP | 2004372 B1 | 8/2014 |
| EP | 2452807 B1 | 7/2015 |
| EP | 2644940 B1 | 7/2015 |
| EP | 2644360 B1 | 9/2015 |
| EP | 2772345 B1 | 8/2016 |
| WO | WO 2007/148301 A2 | 12/2007 |

\* cited by examiner

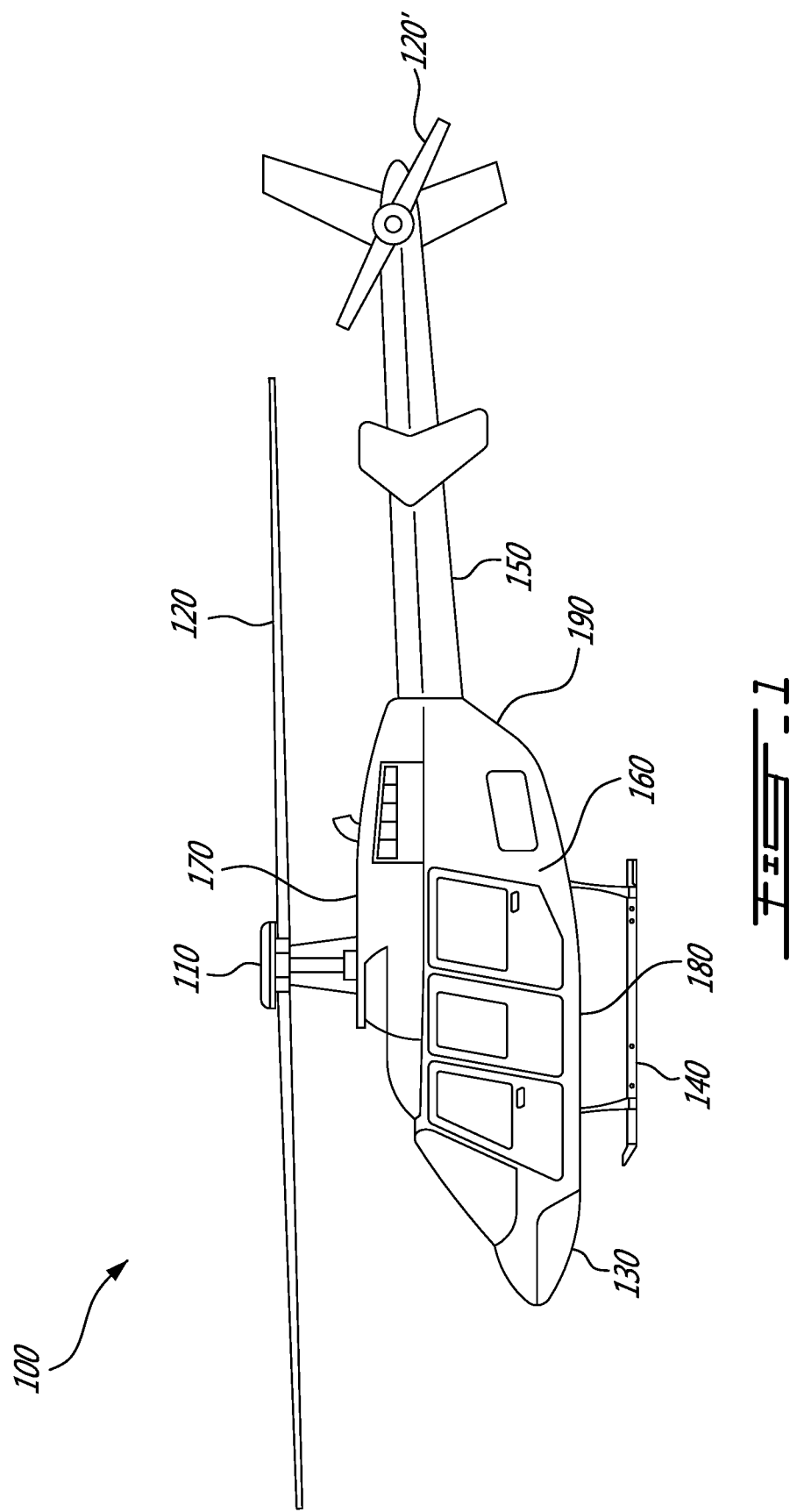

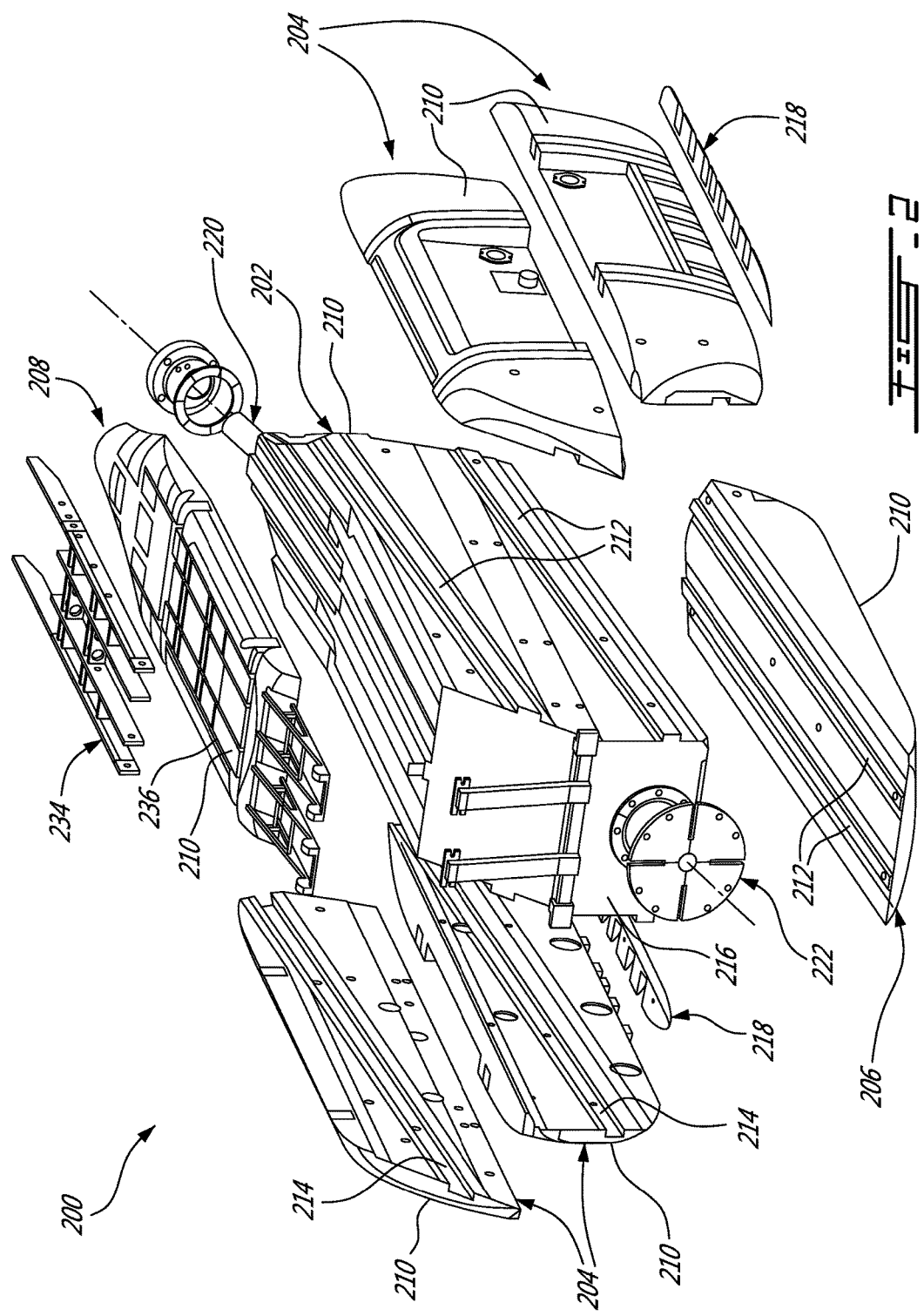

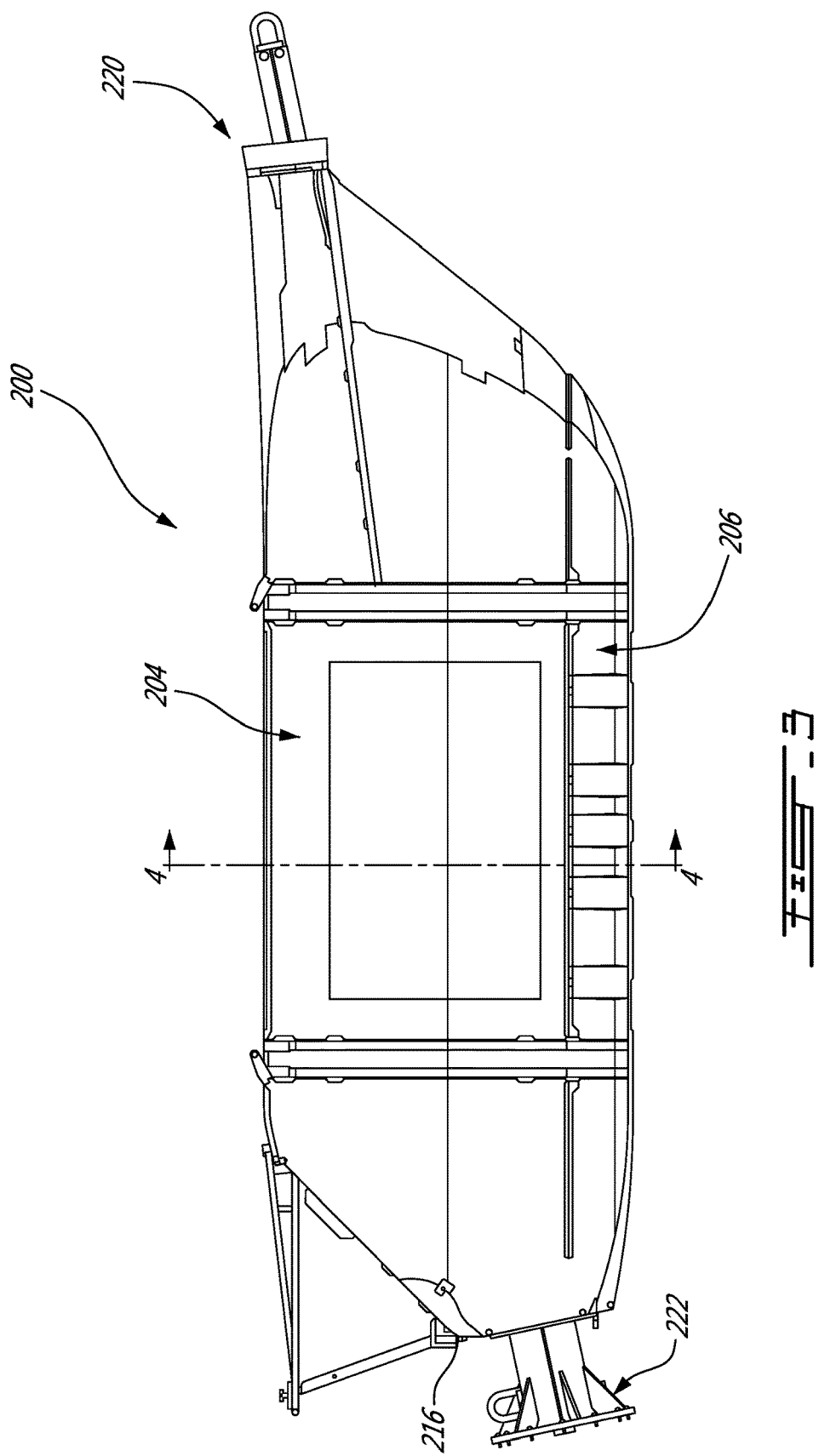

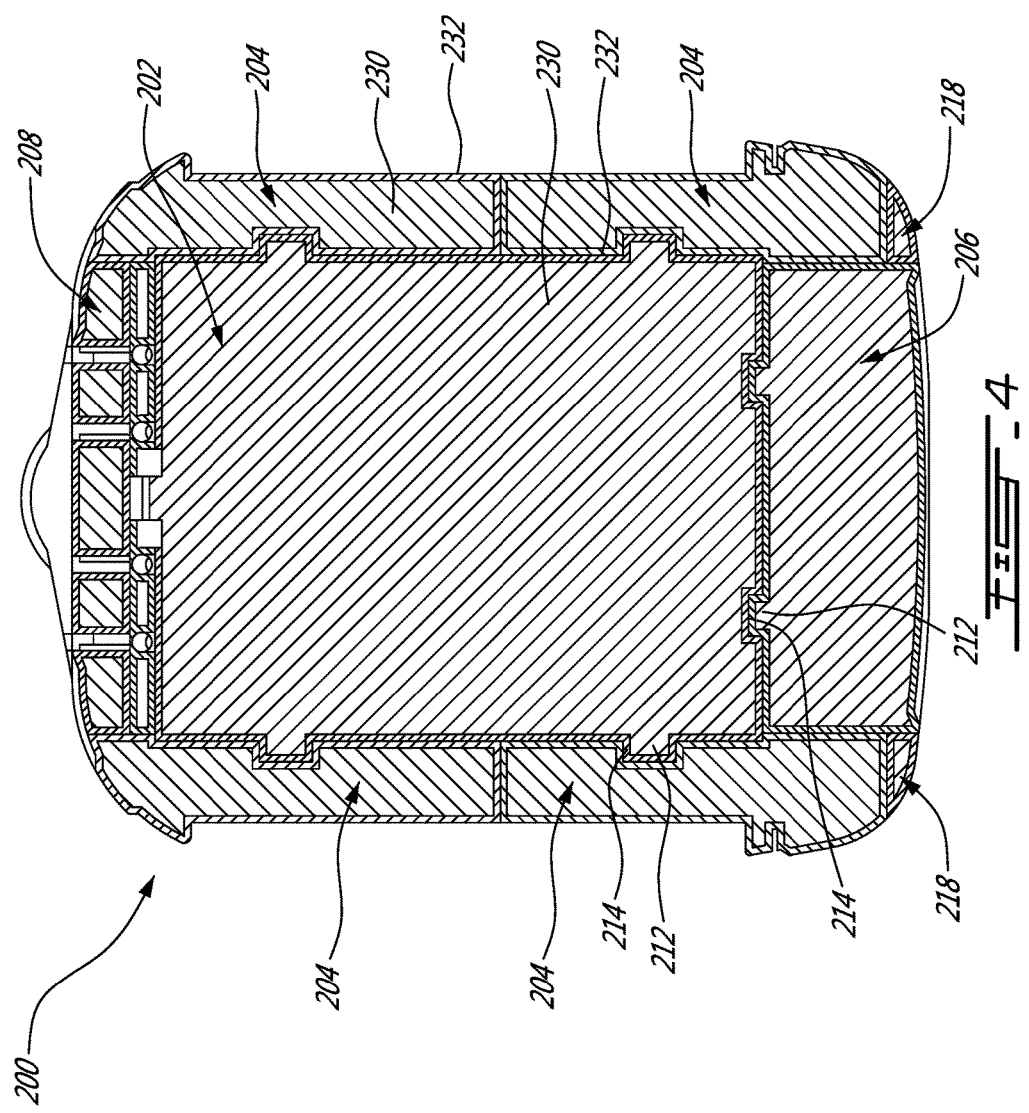

MODULAR MANDREL FOR MONOLITHIC COMPOSITE FUSELAGE

CROSS-REFERENCE TO RELATED APPLICATIONS

This application claims the benefit of provisional U.S. Patent Application Ser. No. 62/218,278 filed Sep. 14, 2015, the entire contents of which are incorporated by reference herein.

FIELD OF THE INVENTION

The application generally relates to the manufacture of large composite structures and, more particularly, to the manufacture of monolithic structures.

BACKGROUND OF THE INVENTION

When manufacturing composite aircraft fuselages, multiple primary and secondary structural parts are typically molded, cured and trimmed separately, and then assembled together, using numerous tools for each of these operations. Each tool and operation usually increases the costs and time of the manufacturing process.

Some large composite airframe sections are manufactured using collapsible mandrels or collapsible tooling in order to be able to extract the mandrel or tooling from within the completed structure after curing. However, collapsible tooling can be relatively complex and/or more prone to failure or damage than solid tooling.

SUMMARY OF THE INVENTION

In one aspect, there is provided a method of manufacturing a self-supporting, monolithic fuselage body, the method comprising: engaging a plurality of peripheral mandrel sections around a central mandrel section, the peripheral mandrel sections each including a shape-retaining core of a thermally insulating material and an outer layer on an outer surface of the shape-retaining core, the outer layer of the peripheral mandrel sections cooperating to define a mold surface; placing uncured composite material on the mold surface to form a skin of the monolithic fuselage; curing the composite material on the mold surface by heating the composite material in a pressurized atmosphere, a coefficient of thermal expansion of the composite material varying within a predetermined range during the cure, the outer layer of the peripheral mandrel sections having a coefficient of thermal expansion within the predetermined range; after the composite material is cured, sliding the central mandrel section out of engagement with the peripheral mandrel sections without collapsing the central mandrel section; disengaging the peripheral mandrel sections from the cured composite material without collapsing the peripheral mandrel sections, the cured composite material forming the fuselage body.

In another aspect, there is provided a mandrel for layup and cure of a predetermined composite material in the manufacture of a monolithic fuselage, the mandrel comprising: a central mandrel section; a plurality of peripheral mandrel sections cooperating to surround the central mandrel section, the peripheral mandrel sections together defining a mold surface for receiving the predetermined composite material; wherein the central mandrel section is slidingly engaged to the peripheral mandrel sections and is configured to be slidable out of the fuselage after the curing of the predetermined composite material; wherein each of the peripheral mandrel sections includes a shape-retaining core of a thermally insulating material and an outer layer on an outer surface of the shape-retaining core and defining the mold surface, the outer layer being made of a material having a coefficient of thermal expansion within a range defined by a variation of a coefficient of thermal expansion of the predetermined composite material during the cure.

BRIEF DESCRIPTION OF THE DRAWINGS

Reference is now made to the accompanying figures in which:

FIG. 1 is a schematic side view of a rotorcraft in accordance with a particular embodiment;

FIG. 2 is a schematic, tridimensional exploded view of a modular mandrel for manufacturing a fuselage of a rotorcraft such as shown in FIG. 1, in accordance with a particular embodiment;

FIG. 3 is a schematic side view of the modular mandrel of FIG. 2; and

FIG. 4 is a schematic cross-sectional view of the modular mandrel of FIG. 2, taken along lines 4-4 of FIG. 3.

DETAILED DESCRIPTION

Illustrative embodiments of the methods and apparatuses are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. It should also be appreciated that teachings regarding rotorcraft 100 may apply to aircraft and vehicles other than rotorcraft, such as airplanes and unmanned aircraft, to name a few examples.

The present disclosure provides for a mandrel and method of manufacturing the body of the fuselage 130 in a monolithic manner. In a particular embodiment, the monolithic fuselage body includes at least 80% of the sum of parts forming the finished fuselage 130 of the rotorcraft 100. Accordingly, 80% of the parts that make up the fuselage 130 can be molded, cured and bonded simultaneously without the need for separate molds and major assembly tools, such as to allow for a reduction the number of operations, tools, and/or labor to produce the finished fuselage 130 of the rotorcraft 100.

Referring to FIG. 2-4, a mandrel 200 configured for forming the monolithic (i.e. integrally formed as a single piece, monocoque) fuselage body according to a particular embodiment is shown. As can be best seen in FIG. 2, the mandrel 200 is a modular male mandrel having a plurality of dismountable sections, including a central mandrel section 202 and a plurality of peripheral mandrel sections 204, 206, 208. The peripheral mandrel sections include side mandrel sections 204, a bottom mandrel section 206, and a top mandrel section 208, which cooperate to surround the central mandrel section 202 and together define a male mold surface 210 for receiving the uncured composite material used to form the fuselage body. When engaged to one another, the outer surfaces of the adjacent mandrel sections 204, 206, 208 are aligned with each other so as to define the mold surface 210 in a continuous manner.

In the embodiment shown, the mold surface 210 is shaped to correspond to the shape of side walls 160, a top wall 170, a bottom wall 180, and a rear wall 190 of the fuselage 130 (see FIG. 1). The rear of the central mandrel section 202 also defines part of the mold surface 210, to form part of the real wall. Alternatively, the central mandrel section 202 could be configured so as not to contact the composite material, for example, by being completely surrounded by the peripheral mandrel sections 204, 206, 208.

Each of the mandrel sections 202, 204, 206, 208 is solid and not collapsible; it has a permanent shape, i.e., its shape remains the same throughout the layup, cure and unmolding process. The central mandrel section 202 is slidingly engaged to the peripheral mandrel sections 204, 206, 208 and is configured to be slidable out of the fuselage 130 after the composite material is cured, so that the mandrel sections 202, 204, 206, 208 can be disengaged from the cured material. In the embodiment shown and as can be best seen in FIG. 4, mating surfaces of the central mandrel section 202 and of the peripheral mandrel sections 204, 206, 208 include parallel sets of complementary tongues 212 and grooves 214 defining the sliding engagement between the mandrel sections 202, 204, 206, 208. It is understood that any other mating configuration or mating element(s) allowing the relative sliding movement can alternatively be used.

In the embodiment shown, the mandrel sections 202, 204, 206, 208 are configured so that the front surface 216 (see FIG. 2) of the central mandrel section 202 remains unobstructed by the composite material after cure, so as to be able to slide the central mandrel section 202 out of the cured fuselage 130 through the opening configured to receive the front windshield. In an embodiment where the central mandrel section 202 contacts the composite material such as shown, the relative sliding movement between the mandrel sections 202, 204, 206, 208 is defined along a direction at least substantially perpendicular (i.e., substantially perpendicular or perpendicular) to the part of the mold surface 210 defined by the central mandrel section 202, so as to avoid interference from and/or damage to the cured composite material upon sliding of the central mandrel section 202 out of the cured body of the fuselage 130.

As can be best seen in FIG. 2, additional mandrel sections 218 may be provided in detachable engagement with one or more of the peripheral mandrel sections 204, 206, 208 (i.e., not directly connected to the central mandrel section 202) to define the mold surface 210, for example, at corner junctions between walls. Some or all of the peripheral mandrel sections 202, 204, 206, 208 can be made of two or more detachably interconnected parts, for example, to facilitate unmolding operations. In one example embodiment, the mandrel 200 includes 33 separate solid sections detachably connected to one another to form the final shape of the mandrel 200.

In the embodiment shown, the mandrel 200 includes a shaft 220 and a drive tray 222 drivingly connected to each other and extending from opposed sides of the mandrel 200, used to support and rotate the mandrel 200 when the composite material is placed on the mold surface 210. The mandrel 200 can be rotated through rotation of the drive tray 222. Other configurations are also possible.

Referring to FIG. 4, the central and peripheral mandrel sections 202, 204, 206, 208 (and, in the embodiment shown, the additional mandrel sections 218) include a shape-retaining core 230 and an outer layer 232 on an outer surface of the shape-retaining core 230, in at least the portion(s) of the mandrel section defining the mold surface 210. In the embodiment shown, each mandrel section 202, 204, 206, 208, 218 has the outer layer 232 completely surrounding the core 230, so that the entire outer surface of the mandrel section 202, 204, 206, 208, 218 is defined by the outer layer 232.

The core 230 is made of a material sufficiently rigid to withstand autoclave pressure (e.g., 85 psi, 90 psi) while allowing the mandrel section to retain its shape. The material of the core 230 is a thermally insulating material, i.e., a material having a thermal conductivity sufficiently low so as to inhibit conductive heat transfer across the core 230. Accordingly, the core 230 does not define a substantial heat sink (defines no heat sink or heat sink sufficiently low so as not to have a substantial impact on the temperature of the composite material during cure). For example, in a particular embodiment, the material of the core 230 has a thermal conductivity having a value corresponding to one or more of the following: less than 1 W/m° K; less than 0.6 W/m° K; approximately 0.25 W/m° K. In a particular embodiment, the core 230 is made of thermally insulating carbon foam such as a thermally insulating grade of Cfoam®, for example, a grade of Cfoam® having a thermal conductivity of about 0.25 W/m° K. The core 230 forms the bulk of the central and peripheral mandrel sections 202, 204, 206, 208, so that the central and peripheral mandrel sections 202, 204, 206, 208 are not significantly heated during the cure cycle of the composite material.

Each of the central and peripheral mandrel sections 202, 204, 206, 208, 218 has a rigidity sufficient to withstand autoclave pressure (e.g. 85 psi, 90 psi) at the temperatures of the cure cycle of the composite material.

The outer layer 232 is made of a material having a coefficient of thermal expansion within a range defined by the variation of a coefficient of thermal expansion of the composite material during the cure cycle. Accordingly, heating of the mandrel 200 during the cure cycle is focused in the outer layer 232 and not throughout the entire mandrel 200. For example, in a particular embodiment, the composite material being cured includes carbon fibers in an epoxy resin and has a coefficient of thermal expansion varying from $1.10 \times 10^{-6}$ to $1.70 \times 10^{-6}$ when heated from 70° F. to 356° F., while the material of the outer layer 232 is a nickel-iron alloy such as invar 36 with a coefficient of thermal expansion of $1.17 \times 10^{-6}$ at 300° F., i.e., within the range of the variation of coefficient of thermal expansion of the carbon/epoxy composite. Other materials and values are also possible.

In a particular embodiment, the outer layer 232 is made of the same material as the composite material being cured, but of a different grade suitable for use in tooling (e.g. with greater heat resistance). For example, in a particular embodiment where the mandrel 200 is configured for use with a composite material including carbon fibers in an epoxy resin, the outer layer 232 is made of a tooling composite material including carbon fibers in an epoxy resin. Accordingly, the coefficient of thermal expansion for the outer layer 232 and for the material being cured may be identical or substantially identical.

It is understood that the particular geometry shown and described for the mandrel 200 is configured for a particular rotorcraft 100 and that the geometry can be adapted to suit any fuselage configuration. For example, more than one central mandrel section 202 can be provided. The number of mandrel sections may vary in accordance with the geometry and/or size of the fuselage body being manufactured. Other configurations are, of course, possible.

In use and in accordance with a particular embodiment, the monolithic body of the fuselage 130 is manufactured by engaging the peripheral mandrel sections 204, 206, 208 around the central mandrel section(s) 202, and placing a plurality of layers of uncured composite material on the mold surface 210 defined by the mandrel sections 202, 204, 206, 208 to form at least the skin of the monolithic fuselage body. The layup of composite material can be done using any suitable method or combination of methods, including, but not limited to, manual or automated layup of prepreg layers, and automated fiber placement (AFP).

In a particular embodiment, the layers of uncured composite material are disposed to also form additional structural elements (e.g., inner structural primary parts such as stiffeners, lift frame, roof beam, floor beam, bulkhead, secondary parts, etc.) in contact with the skin, which may be assembled prior to being placed on the mandrel 200. In addition, or alternatively, cured structural elements (e.g., inner structural primary parts, secondary parts) may be disposed in contact with the uncured skin. It is understood that the mold surface 210 of the mandrel 200 is shaped to receive and support the additional structural elements when provided, and to adequately position the elements with respect to the skin during layup. An example of a structural primary part 234 is shown in FIG. 2, with the mold surface 210 including grooves 236 complementary to the structural primary part 234 to receive the part therein before the composite material of the skin is placed in contact with the part.

The composite material on the mold surface 210, and the uncured elements, if present, are cured and bonded by heating the composite material in a pressurized atmosphere, for example, in an autoclave. It is understood that the uncured composite material and mandrel assembly is suitably prepared before the cure cycle, such as by vacuum bagging with suitable breather material and caul plates or pressure pads; such preparation methods are well known in the art and will not be discussed further herein. If cured elements were disposed in contact with the uncured material of the skin before the cure cycle, the cured elements are bonded with the skin by the heat and pressure of the cure cycle. The co-curing and/or co-bonding of the elements and skin results in a monolithic fuselage body once the cure cycle is performed.

In a particular embodiment, the uncured composite material and mandrel assembly are cured in a free vacuum bag containing the entirety of the central and peripheral mandrel sections 202, 204, 206, 208, 218. The rigidity of the central and peripheral mandrel sections 202, 204, 206, 208, 218 allows for the mandrel 200 to form a self-supporting structure able to withstand the pressure applied by the autoclave environment in the interior of the vacuum bag. By contrast, tooling not adapted to withstand autoclave pressures typically requires that the vacuum bag(s) be tailored to the periphery of the uncured composite material so as to minimize the portion of the tooling contained with the vacuum bag(s). The mandrel 200 may thus allow for a simplification of the bagging process.

In a particular embodiment, the thermally insulating material of the mandrel core 230 allows for heating the composite material without heating the entire mandrel 200 to the cure temperature, which in a particular embodiment facilitates application of the required cure cycle to the composite material. Since the mandrel 200 has a relatively large size (for example, corresponding substantially to that of a rotorcraft fuselage 130), the length of time require to heat a similar size mandrel without thermally insulating material and accordingly acting as a heat sink may prevent the desired ramp-up in temperature of the desired cure cycle to be applied to the composite material.

In a particular embodiment, the matching of the coefficient of thermal expansion of the mandrel outer layer 232 and of the composite material allows to reduce, minimize, or avoid thermal stress and distortions of the composite material during the cure cycle.

After the composite material is cured, the central mandrel section 202 is slid out of engagement with the peripheral mandrel sections 204, 206, 208 and out of the fuselage 130. For example, central mandrel section 202 may exit the fuselage 130 from the front window opening in the embodiment shown, while the central mandrel section 202 maintains its shape. Once the central mandrel section 202 is removed, the peripheral mandrel sections 204, 206, 208 and additional sections 218 are free to be disengaged from the cured material and removed from the fuselage 130, again while maintaining their shapes. The slidable configuration of the mandrel sections 202, 204, 206, 208 allows for the mandrel sections to be removable from the cured fuselage body without the need for a collapsing mandrel structure.

In a particular embodiment, the molded body of the fuselage 130 is self-supporting upon disengagement from the mandrel sections 202, 204, 206, 208, 218. That is, the fuselage 130 does not require any additional support structure to maintain its shape once disengaged from the mandrel 200. Accordingly, in a particular embodiment, this may allow for the tooling required to perform subsequent finishing operations to be less complex, which may reduce time and/or costs of such finishing operations as compared to a body requiring a support structure.

In a particular embodiment, the dismountable mandrel sections 202, 204, 206, 208, 218 allow for layup of the composite materials, and co-cure and/or co-bond of the skin and inner structural primary parts 234. The mandrel 200 may reduce the number of operations, tools and labor to produce a monolithic fuselage 130, as compared to the separate manufacture and subsequent assembly of fuselage sections.

In the embodiment shown, the mandrel 200 is exposed to the autoclave pressure only along its outer surface, which may reduce the risk of breaks in the vacuum bag(s) and/or leaks during the cure cycle. In an alternative embodiment, some or all of the mandrel sections may be open (i.e., hollow) so as to be exposed to the autoclave pressure on inside surfaces as well.

In a particular embodiment, the configuration of the mandrel 200 allows for the mandrel 200 to be scalable to be used to manufacture different sizes of fuselage without significant changes being required.

Although the present mandrel 200 and method have been discussed in relation to the fuselage 130 of a rotorcraft 100, it is understood that, alternatively, the mandrel 200 can be configured to manufacture any other suitable type of monolithic composite fuselage. For instance, a modular mandrel, similar to that of the depicted embodiments, may be used to manufacture the tail section empennage 150. The mandrel 200 can also be configured to manufacture any other suitable type of monolithic composite structures, including, but not limited to, in aerospace, boats, automobiles, etc.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of manufacturing a self-supporting, monolithic fuselage body, the method comprising:
   engaging a plurality of peripheral mandrel sections around a central mandrel section, the peripheral mandrel sections each including a shape-retaining core of a thermally insulating material and an outer layer on an outer surface of the shape-retaining core, the outer layer of the peripheral mandrel sections cooperating to define a mold surface;
   placing uncured composite material on the mold surface to form a skin of the monolithic fuselage;
   curing the composite material on the mold surface by heating the composite material in a pressurized atmosphere, a coefficient of thermal expansion of the composite material varying within a predetermined range during the cure, the outer layer of the peripheral mandrel sections having a coefficient of thermal expansion within the predetermined range;
   after the composite material is cured, sliding the central mandrel section out of engagement with the peripheral mandrel sections along a direction substantially perpendicular to a portion of the mold surface without collapsing the central mandrel section;
   disengaging the peripheral mandrel sections from the cured composite material without collapsing the peripheral mandrel sections, the cured composite material forming the fuselage body,
   wherein the central mandrel section includes a shape-retaining core of the thermally insulating material and an outer layer surrounding the shape-retaining core, the outer layer of the central mandrel section defining a part of the mold surface.

2. The method according to claim 1, wherein the peripheral mandrel sections are engaged around a single central mandrel section.

3. The method according to claim 1, wherein placing the uncured composite material on the mold surface further includes forming a plurality of structural elements in contact with the uncured composite material that forms the skin of the monolithic fuselage, and wherein curing the composite material includes co-curing the skin and the structural elements.

4. The method according to claim 1, further comprising placing a plurality of cured structural elements in contact with the uncured composite material that forms the skin of the monolithic fuselage, and wherein curing the composite material further includes co-bonding the skin and the structural elements.

5. The method according to claim 1, wherein the outer layer of the peripheral mandrel sections has a coefficient of thermal expansion corresponding to that of the composite material.

6. The method according to claim 1, wherein the outer layer of the peripheral mandrel sections and the composite material both include carbon fibers in an epoxy resin.

7. The method according to claim 1, wherein the thermally insulating material has a thermal conductivity of less than 1 W/m° K.

8. The method according to claim 1, wherein the thermally insulating material is carbon foam.

9. The method according to claim 1, wherein the monolithic fuselage body includes at least 80% of a sum of parts forming a finished fuselage of a rotorcraft.

* * * * *